(12) United States Patent
Finley

(10) Patent No.: US 6,763,920 B2
(45) Date of Patent: Jul. 20, 2004

(54) SELF-CONTAINED BIDIRECTIONAL END-OF-STROKE HYDRAULIC SNUBBER

(75) Inventor: Luke G. Finley, Hamburg, NY (US)

(73) Assignee: Moog Inc., East Aurora, NY (US)

( * ) Notice: Subject to any disclaimer, the term of this patent is extended or adjusted under 35 U.S.C. 154(b) by 9 days.

(21) Appl. No.: 10/184,700

(22) Filed: Jun. 28, 2002

(65) Prior Publication Data

US 2004/0000455 A1 Jan. 1, 2004

(51) Int. Cl.[7] .................................................. F16F 9/48
(52) U.S. Cl. ........................ 188/287; 92/152; 188/289
(58) Field of Search ................................ 188/287, 289, 188/288, 297, 298; 288/64.28, 119, 113, 124, 125, 126, 127, 118

(56) References Cited

U.S. PATENT DOCUMENTS 3,698,284 A * 10/1972 Toering et al. ............. 188/289
3,889,934 A * 6/1975 Kamman .................... 188/287
5,205,200 A * 4/1993 Wright ......................... 92/62
5,720,368 A * 2/1998 Richardson ................. 188/287

* cited by examiner

Primary Examiner—Matthew C. Graham
(74) Attorney, Agent, or Firm—Phillips Lytle LLP

(57) ABSTRACT

A bidirectional self-contained end-of stroke snubbing device (20) includes a housing (21), a rod (22) movable relative to the housing, a single fluid-filled variable-volume chamber (23) communicating with a fluid sump (24) through an orifice (65), and a lost-motion mechanism for selectively reducing the volume of the chamber proximate either end of the stroke of the rod-like member. The mechanism will force fluid from the chamber through the orifice to decelerate and cushion movement of the rod-like member relative to the housing proximate either end of its stroke.

7 Claims, 2 Drawing Sheets

US 6,763,920 B2

SELF-CONTAINED BIDIRECTIONAL END-OF-STROKE HYDRAULIC SNUBBER

TECHNICAL FIELD

The present invention relates generally to hydraulic snubbers, and, more particularly, to an improved self-contained end-of-stroke hydraulic snubber that is intended to decelerate and cushion movement of an actuator rod at either end of its stroke.

BACKGROUND ART

Hydraulic actuators are frequently fitted with separate snubbing mechanisms to decelerate and reduce the impact of the piston hitting the end of the cylinder at either end of its stroke. With the advent with electro-mechanical screw actuators, separate hydraulic snubber assemblies are frequently added to decelerate and cushion both ends of the actuator rod movement.

Hydraulic actuators used in flight simulator motion systems have been using end-of-stroke cushions integrated into the hydraulic cylinder for many years. When electrical actuators began to be used in motion systems in the early 1990's, there was a need to incorporate snubbers to perform this cushioning function. In a hydraulic actuator, it is straight-forward to incorporate snubbing. In an electro-mechanical actuator, however, snubbing requires a separate add-on device for that purpose. One approach has been to use separate snubber cylinders packaged either inside or outside of the actuator at each end.

Details as to such prior art snubbers are shown and described in U.S. Pat. Nos. 5,931,739, 5,720,368, 5,509,511, 5,387,083, 5,271,485, 3,766,798 and 3,200,664, the aggregate disclosures of which are hereby incorporated by reference.

DISCLOSURE OF THE INVENTION

With parenthetical reference to the corresponding parts, portions or surfaces of the disclosed embodiment, merely for purposes of illustration and not by way of limitation, the present invention broadly provides (e.g., in FIG. 1) an improved single self-contained bidirectional end-of-stroke hydraulic snubbing device (20) that is operative to decelerate and cushion movement of an actuator rod (22) at either end of its stroke. The improved snubber broadly includes: a housing (21), a rod (22) movable relative to the housing; a single fluid-filled variable-volume chamber (23) communicating with a fluid sump (66) through an orifice (65), and a lost-motion mechanism (25) for selectively and controllably causing a reduction of the volume of the chamber by motion of the member approaching either end of its stroke; whereby the mechanism will force fluid from the chamber through the orifice to decelerate and cushion movement of the rod relative to the housing proximate either end of its stroke.

The chamber may possibly be defined between a piston and a cylinder, as shown in FIG. 1. Alternatively, the chamber may be defined between a cylinder and two pistons, as shown in FIG. 2. The cylinder may be concentric with the rod. The fluid sump may include an accumulator (68), which may be pressurized if desired. The lost-motion mechanism may include a first abutment member (26) mounted on the member to engage one portion of the wall of the chamber, and a second abutment member (28) mounted on the member to engage another portion of the chamber wall.

Accordingly, the general object of this invention is to provide an improved end-of-stroke snubbing device.

Another object is to provide a single snubbing device which may be mounted on an electro-mechanical actuator, and which may selectively and controllably decelerate and cushion movement of the actuator rod proximate either end of its stroke.

These and other objects and advantages will become apparent from the foregoing and ongoing written specification, the drawings, and the appended claims.

DESCRIPTION OF THE PREFERRED EMBODIMENTS

Figure 1:
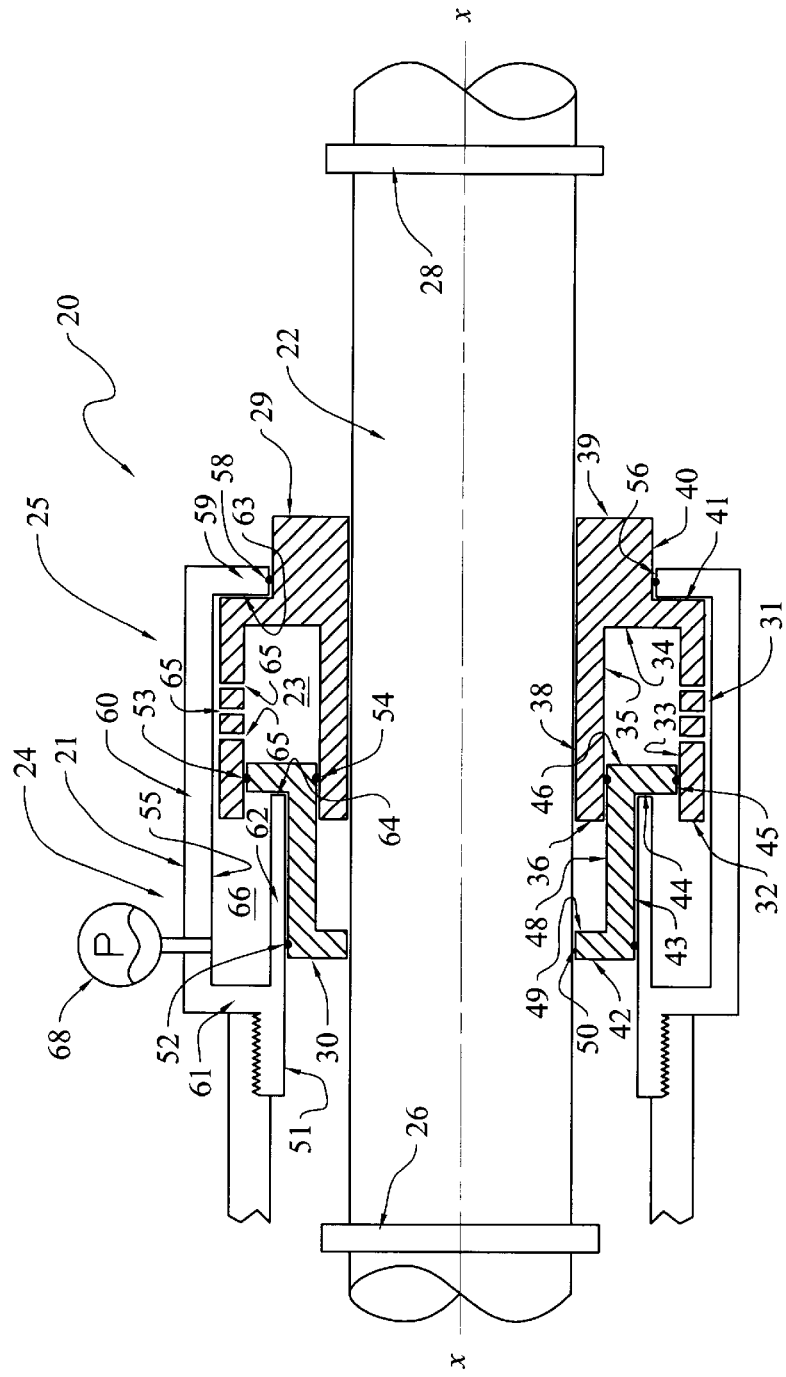
FIG. 1 is a schematic view, partly in elevation and partly in section, showing a first form of the improved snubbing device.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down" as well as adjectival and adverbial derivatives thereof (e.g.,"horizontally", "rightwardly", "upwardly", etc.), simply refer to the orientation of the illustrated structure as the particular drawing figure normally faces the reader. Similarly, the terms"inwardly" and "outwardly" generally refer to the orientation of a surface relative to its axis of elongation, or axis of rotation, as appropriate.

First Embodiment (Piston-Cylinder) (FIG. 1)

Referring now to the drawings, and, more particularly, to FIG. 1 thereof, the first form of the improved end-of-stroke snubbing device is generally indicated at 20. This device is shown as broadly including a housing, a fragmentary portion of which is generally indicated at 21; an actuator rod 22 movable relative to the housing; a single fluid-filled variable-volume chamber 23; a fluid sump 24; and a lost-motion mechanism 25.

In FIG. 1, rod 22 is shown as being a horizontally-elongated cylindrical member which is mounted for controlled horizontal movement along its axis x-x. The rod has a pair of axially-spaced annular stops or shoulder members extending radially outwardly therefrom. The left shoulder member is indicated at 26, and the right shoulder member is indicated at 28. Members 26 and 28 may be formed integrally with rod 22, or may be formed separately and subsequently attached to the rod, as desired. Rod 22 is thus mounted for horizontal reciprocating movement relative to housing 21.

The snubber includes the single fluid-filled variable-volume chamber 23, which is defined between a rightward inverted reversed C-shaped cylinder member 29 and a leftward piston member 30 received therein. Members 29 and 30 are mounted for selective axial movement relative to one another to vary the volume of intermediate chamber 23, as described infra.

Cylinder member 29 is shown as having an annular leftwardly-opening cup-shaped transverse cross-section. More particularly, this cross-section is sequentially bounded by an outwardly-facing horizontal cylindrical surface 31, a leftwardly-facing annular vertical surface 32, and inwardly-facing cylindrical surface 33, a leftwardly-facing annular vertical surface 34, an outwardly-facing horizontal cylindrical surface 35, a leftwardly-facing annular vertical surface 36 substantially coplanar with surface 32, an inwardly-facing horizontal cylindrical surface 38, and a rightwardly-facing annular vertical surface 39, an outwardly-facing horizontal cylindrical surface 40, and a rightwardly-facing annular vertical surface 41 extending radially outwardly therefrom to join the right end of surface 31.

Piston member 30 is shown as being a specially-configured annular member that is sequentially bounded by a leftwardly-facing annular vertical surface 42, an outwardly-facing horizontal cylindrical surface 43, a leftwardly-facing annular vertical 44, an outwardly-facing horizontal cylindrical surface 45, a rightwardly-facing annular vertical surface 46, an inwardly-facing horizontal cylindrical surface 48, a rightwardly-facing annular vertical surface 49, and an inwardly-facing horizontal cylindrical surface 50 extending leftwardly therefrom to join the inner margin of left end face 42.

Piston member surface 43 is arranged in closely-spaced facing relation to an inwardly-facing horizontal cylindrical surface 51 of the housing, and the sliding joint therebetween is sealed by means of an O-ring 52. Piston member surface 45 is arranged in closely-spaced facing relation to surface 33, and the sliding joint therebetween is sealed by an O-ring 53. Piston member surface 48 is arranged in closely-spaced facing relation to surface 35, and the sliding joint therebetween is sealed by a means of an O-ring 54. Cylinder member surface 31 is arranged in spaced facing relation to an inwardly-facing horizontal cylindrical surface 55 of the housing. Cylinder member surface 40 is arranged in closely-spaced facing relation to housing surface 56, and the joint therebetween is sealed by an O-ring 58.

The housing is shown, in pertinent part, as having a rightward portion 59 which extends radially inwardly toward the member, an outer portion 60, a leftward portion 61, and an inner portion 62 which extends rightwardly from the inner margin of leftward portion 61. The leftwardly-facing annular vertical surface 63 of housing rightward portion 59 serves as an abutment stop to limit rightward movement of cylinder member 29. The rightwardly-facing annular vertical surface 64 of housing inner portion 62 serves as an abutment stop to limit leftward movement of member 30. Members 29 and 30 define a fluid-filled variable-volume chamber 23 therebetween, which communicates via three axially-spaced orifices, severally indicated at 65, with a sump chamber 66. This sump chamber in turn communicates with the pressurized accumulator 68.

Snubber 20 does not interfere with normal movement of the rod-like member 22 relative to the housing intermediate the ends of its stroke. However, if the rod-like member were to be moved rightwardly relative to the housing toward the rightward end of its stroke, the annular vertical right face of left rod abutment 26 would first engage piston surface 42. Thereafter, continued rightward movement of rod 22 would cause piston member 30 to move rightwardly within cylinder member 29, thereby forcing fluid in chamber 23 to pass through orifices 65, 65, 65 into sump chamber 66, and from there into accumulator 68. In this regard, it should be noted that rightward movement of piston member 30 will sequentially occlude the three spaced orifices, thereby progressively decreasing the orifice area as the piston moves rightwardly within the cylinder. This action will therefore decelerate and cushion such rightward movement of the rod relative to the housing.

Conversely, if rod 22 were to be moved leftwardly relative to the housing, the leftwardly-facing annular vertical surface of right rod abutment member 28 would first engage cylinder surface 29. Thereafter, continued leftward movement of the rod relative to the housing would cause member 29 to move leftwardly relative to piston member 30. This would have the same effect of decreasing the volume of fluid-filled chamber 23, causing fluid to be passed through restricted orifices 65, 65, 65 to sump chamber 66, and thence to accumulator 65. Here again, the orifices will be sequentially covered to effectively increase the flow restriction as the cylinder member moves leftwardly toward the end of its stroke.

Figure 2:
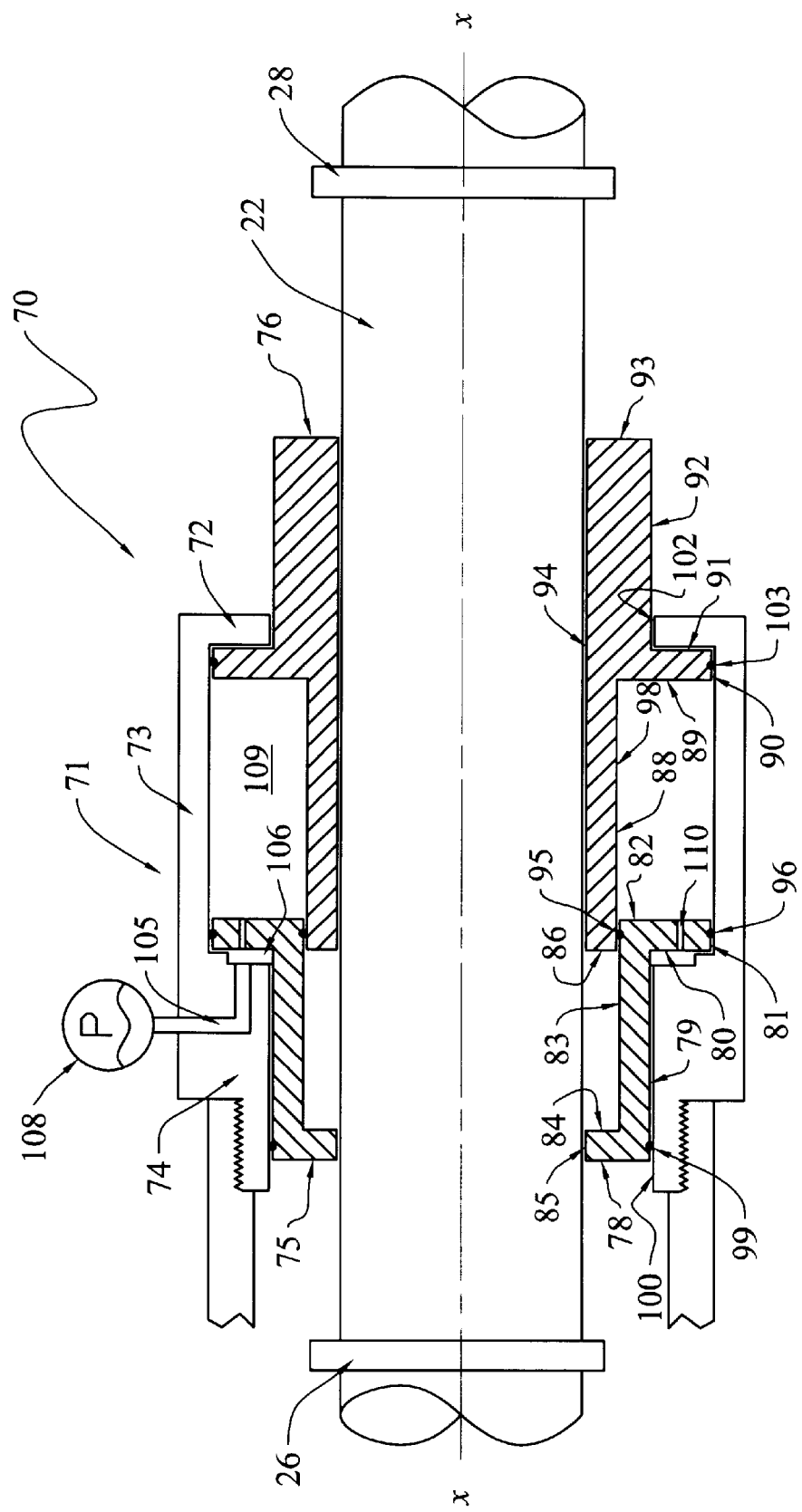
FIG. 2 is a schematic view, again partly in elevation and partly in section, showing a second form of the improved device.

Second Embodiment (Piston-Piston) (FIG. 2)

A second form of the inventive snubber is shown in FIG. 2. In this form, the snubber is generally indicated at 70. The snubber is again shown as having a rod 22 provided with axially-spaced bosses or abutment stops 26, 28 respectively. The housing is generally indicated at 71. In this second form, the housing has a rightward portion 72 which extends radially inwardly toward the rod, an intermediate portion 73, and a leftward portion 74. In this form, the mechanism includes a leftward piston member 75 and a rightward piston member 76. These two piston members are mounted for movement within a cylinder-like member defined by the housing.

Left piston member 75 is shown as being a specially-configured member somewhat analogous to member 30 in the first embodiment. More particularly, left piston member 75 is shown as being sequentially bounded by a leftwardly-facing annular vertical surface 78, an outwardly-facing horizontal cylindrical surface 79, a leftwardly-facing annular vertical surface 80, an outwardly-facing horizontal cylindrical surface 81, a rightwardly-facing annular vertical surface 82, an inwardly-facing horizontal cylindrical surface 83, a rightwardly-facing annular vertical surface 84, and an inwardly-facing horizontal cylindrical surface 85 continuing leftwardly therefrom to rejoin the inner margin of left end face 78.

Right piston member 76 is shown as being sequentially bounded by an annular vertical left face 86, an outwardly-facing horizontal cylindrical surface 88, a leftwardly-facing annular vertical surface 89, and outwardly-facing horizontal cylindrical surface 90, a rightwardly-facing annular vertical surface 91, an outwardly-facing horizontal cylindrical surface 92, an annular vertical right end face 93, and an inwardly-facing horizontal cylindrical surface 94 continuing leftwardly therefrom to join the inner margin of left end face 86.

A portion of right piston surface 88 is adapted to be arranged in closely-spaced facing relation to surface 83, and the sliding joint therebetween is sealed by means of an O-ring 95. An O-ring 96 seals the sliding joint between left piston surface 81 and the inwardly-facing surface 98 of the housing. Another O-ring 99 is operatively raised to seal the sliding joint between left piston surface 79 and the inwardly-facing surface 100 of the housing. Still another O-ring 103 is arranged to seal the sliding joint between right piston surface 90 and housing surface 98.

The housing contains a passageway 105 which communicates a small fluid sump chamber 106 with a pressurized accumulator 108.

The snubber shown in FIG. 2, while structurally different, operates functionally in substantially in the same manner as the device shown in FIG. 1.

The snubber does not interfere with normal motion of the rod intermediate the ends of its stroke.

If the rod moves rightwardly relative to the housing toward the end of its stroke, the rightwardly-facing annular vertical surface of left rod abutment 26 will first engage left piston surface 78. Thereafter, continued rightward movement of the rod will cause left piston member 75 to move rightwardly relative to stationary right piston member 76. This will force fluid in variable-volume chamber 109 through restrictive orifice 110 into sump 106, and from there via passage 105 to the pressurized accumulator. This action will decelerate and cushion such rightward movement of the rod relative to the housing at the rightward end of its stroke.

Conversely, should the rod move leftwardly relative to the housing, the leftwardly-facing annular vertical surface of right rod abutment 28 will first engage right piston surface 93. Thereafter, continued leftward movement of the rod relative to the housing will cause right piston member 76 to move leftwardly relative to stationary left piston member 75, again decreasing the volume of fluid-filled chamber 109, and forcing fluid through restrictive orifice 110 and passageway 105 to accumulator 108. This action will decelerate and cushion such leftward movement of the rod adjacent the left end of its stroke.

Therefore, the present invention provides an improved self-contained end-of-stroke snubbing device which is operational bidirectionally (i.e., regardless of the direction the rod moves relative to the housing).

Modifications

Of course many changes modifications maybe made. For example, one of the members may be configured as a piston movable relative to the other, which is configured as cylinder, as shown in FIG. 1. Alternatively, the housing may define a cylinder, and both of the members may be configured as pistons movable within that cylinder, as shown in FIG. 2. The pressurized fluid provided by accumulators 68, 108 biases the piston-cylinder and piston-piston members, respectively, to move apart from one another. However, if the pressurized accumulator were to be omitted, a return spring could perform this function. The materials of construction and dimensions are not considered to be particularly critical, and may be readily changed or modified as desired. Similarly, the general shape and configuration of the various parts are not limited to the particular forms shown. Also, other types of lost-motion connections may be substituted therefor.

Therefore, while two presently-preferred forms of the improved end-of-stroke-snubbing device have been shown and described, and several modifications and changes thereof discussed, persons skilled in this art will readily appreciate that various additional changes and modifications may be made without departing from the spirit of the invention, as defined and differentiated by the following claims.

What is claimed is:

1. A bidirectional end-of-stroke snubbing device, comprising:

a housing;

a rod movable relative to said housing;

a single fluid-filled variable-volume annular chamber communicating with a fluid sump through an orifice, said chamber being defined between at least one piston and a cylinder, each piston and said cylinder being concentric with said rod; and a lost-motion mechanism for selectively causing a reduction of the volume of said chamber by motion of said rod approaching either end of its stroke;

whereby said mechanism will force fluid from said chamber through said orifice to decelerate movement of said rod relative to said housing proximate either end of its stroke.

2. A device as set forth in claim 1 wherein said chamber is defined between a cylinder and two pistons.

3. A device as set forth in claim 1 wherein said sump is an accumulator.

4. A device as set forth in claim 3 wherein said accumulator is pressurized.

5. A device as set forth in claim 1 wherein said mechanism includes a first abutment surface mounted on said rod to engage one of said piston and cylinder.

6. A device as set forth in claim 1 wherein said mechanism includes a second abutment surface mounted on said rod to engage another of said piston and cylinder.

7. A device as set forth in claim 1 wherein the size of said orifice decreases as the volume of said chamber decreases.

* * * * *